(12) United States Patent
Farroni et al.

(10) Patent No.: US 7,110,647 B2
(45) Date of Patent: Sep. 19, 2006

(54) MULTIMODE POLARIZATION MAINTAINING DOUBLE CLAD FIBER

(75) Inventors: Julia A. Farroni, Windsor, CT (US); Upendra H. Manyam, Hartford, CT (US); Kanishka Tankala, South Windsor, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/910,924

(22) Filed: Aug. 3, 2004

(65) Prior Publication Data

US 2005/0008311 A1  Jan. 13, 2005

Related U.S. Application Data

(63) Continuation-in-part of application No. 10/760,680, filed on Jan. 19, 2004, now abandoned.

(60) Provisional application No. 60/440,900, filed on Jan. 17, 2003.

(51) Int. Cl.
*G02B 6/024* (2006.01)
(52) U.S. Cl. ................. 385/123; 385/126
(58) Field of Classification Search ............ 385/11, 385/125–128
See application file for complete search history.

(56) References Cited

U.S. PATENT DOCUMENTS

| | | | |
|---|---|---|---|
| 4,478,489 A | 10/1984 | Blankenship et al. | |
| 4,561,871 A | 12/1985 | Berkey | |
| 5,949,941 A | 9/1999 | DiGiovanni | |
| 6,115,526 A | 9/2000 | Morse | |
| 6,477,307 B1 | 11/2002 | Tankala et al. | |
| 6,483,973 B1 | 11/2002 | Mazzarese et al. | |
| 6,538,807 B1 | 3/2003 | Kakui et al. | |
| 6,625,363 B1 | 9/2003 | Carter et al. | |

(Continued)

FOREIGN PATENT DOCUMENTS

WO  WO 2005/074573 A2  8/2005

(Continued)

OTHER PUBLICATIONS

R. Paschotta et al., "Ytterbium-doped fiber amplifiers," IEEE Journal of Quantum Electronics, 33(7), 1049-1056, 1997.

(Continued)

*Primary Examiner*—Akm Enayet Ullah
*Assistant Examiner*—Omar Rojas
(74) *Attorney, Agent, or Firm*—Peter J. Rainville

(57) ABSTRACT

A polarization maintaining optical fiber has a core extending along a longitudinal axis, where the core includes a rare earth and a first index of refraction. A cladding is disposed about the core and has a first thermal coefficient of expansion (TCE) and a second index of refraction that is less than the first index of refraction. The fiber can include a pair of longitudinally extending members, and each of the members can have a TCE that is different than the first TCE of the cladding. The pair can be spaced apart by a distance $d_f$. A second cladding can be disposed about the first cladding, and the second cladding can have a third index of refraction that is less than the second index of refraction. The fiber can have a fundamental mode having a mode field diameter (MFD). The core can be a multimode core having a diameter $d_c$ that is greater than or equal to 15 microns, the numerical aperture of the core relative to the first cladding can be less than or equal to 0.12, the ratio $d_c$/MFD can be greater than 3, and the fiber can provide a beat length of less than 3 mm, where the beat length is measured at a wavelength of 633 nm.

17 Claims, 6 Drawing Sheets

U.S. PATENT DOCUMENTS

| | | | |
|---|---|---|---|
| 6,671,444 B1* | 12/2003 | Arai et al. | 385/126 |
| 6,687,442 B1* | 2/2004 | Shamoto et al. | 385/123 |
| 6,687,445 B1 | 2/2004 | Carter et al. | |
| 6,738,549 B1 | 5/2004 | Inaba et al. | |
| 6,779,364 B1 | 8/2004 | Tankala et al. | |
| 6,825,974 B1* | 11/2004 | Kliner et al. | 359/341.1 |
| 7,003,206 B1 | 2/2006 | Tankala et al. | |
| 2002/0172486 A1* | 11/2002 | Fermann | 385/128 |
| 2004/0069019 A1 | 4/2004 | Carter et al | |
| 2004/0086245 A1 | 5/2004 | Farroni et al. | |
| 2005/0226580 A1 | 10/2005 | Samson et al. | |
| 2006/0029343 A1 | 2/2006 | Farroni et al. | |
| 2006/0029344 A1 | 2/2006 | Farroni et al. | |

FOREIGN PATENT DOCUMENTS

WO    WO 2006/017802 A2    2/2006

OTHER PUBLICATIONS

L. Zenteno, "High-power double-clad fiber lasers," Journal of Lightwave Technology, 11(9), 1435-1446, 1993.

J. Noda et al., "Polarization maintaining fibers and their applications," Journal of Lightwave Technology, 4(8), 1071-1089, 1986.

J. P. Koplow et al., "Polarization-maintaining, double-clad fiber amplifier . . . ," Optics Letters, 25(6), 387-389, 2000.

I. N. Duling III and R. D. Esman, "Single-polarisation fibre amplifier," Electronics Letters, 28(12), 1126-1128, 1992.

K. Tajima, "Er3+-doped single-polarisation optical fibres," Electronics Letters, 26(18), 1498-1499, 1990.

D. A. V. Kliner et al., "Polarization-maintaining amplifier employing double-clad bow-tie fiber," Optics Letters, 26(4), 184-186, 2001.

J. P. Koplow et al., "Single-mode operation of a coiled multimode fiber amplifier," Optics Letters, 25(7), 442-444, 2000.

M. E. Fermann, "Single-mode excitation of multimode fibers with ultra-short pulses," Optics Letters, 23(1), 52-54, 1998.

O. G. Okhotnikov and J.M. Sousa, "Flared single-transverse-mode fibre amplifier," Electronics Letters, 35(12), 1011-1013, 1999.

H. L. Offerhaus et al., "High-energy single-transverse-mode Q-switched fiber laser . . . ," Optics Letters, 23(21), 1683-1685, 1998.

U. Griebner and H. Schonnagel, "Laser Operation with nearly diffraction-limited output . . . ," Optics Letters, 24(11), 750-752, 1999.

R. Paschotta et al., "Lifetime quenching in Yb-doped fibers", Optics Communications, 136, 375-378, 1997.

Z. Burshtein et al., "Impurity local phonon nonradiative quenching of Yb3+. . . ," IEEE Journal of Quantum Electronics, 36 (8), 1000-1007, 2000.

Edvold, Bent; "Polarization Maintaining Fibers"; Thesis for the Industrial Research Education, Ph.D. .; Technical University of Denmark; Apr. 1994.

* cited by examiner

MULTIMODE POLARIZATION MAINTAINING DOUBLE CLAD FIBER

CROSS-REFERENCE TO RELATED APPLICATION

This application is a continuation-in-part of U.S. application Ser. No. 10/760,680, filed Jan. 19, 2004 now abandoned and entitled "Multimode Polarization Maintaining Double Clad Fiber," which claims priority to provisional patent application 60/440,900, filed Jan. 17, 2003 and which is also entitled "Multimode Polarization Maintaining Double Clad Fiber." Both of the foregoing earlier filed applications are herein incorporated by reference.

FIELD OF THE INVENTION

The present invention relates to optical waveguides and methods of making such waveguides, and more particularly to polarization maintaining optical fibers and methods of making such optical fibers.

BACKGROUND

Rare earth (e.g., elements having atomic numbers 57–71) doped optical fibers are known in the art to be useful in fiber amplifiers and lasers. In particular, Yb-doped fibers offer high output powers and excellent conversion efficiencies over a broad range of wavelengths (~975 to ~1200 nm). See, for example, R. Paschotta, J. Nilsson, A. C. Tropper and D. C. Hanna, "Ytterbium doped fiber amplifiers", *IEEE Journal of Quantum Electronics*, 33(7), 1049–1056, 1997. In addition, unlike erbium doped amplifiers, complications such as excited state absorption and concentration quenching are avoided in Yb-doped fiber lasers and amplifiers. As a result, a high concentration of Yb ions can be incorporated while maintaining good conversion efficiencies. These attributes of Yb-doped fibers, along with the advent of double-clad fiber (DCF) technology, have resulted in substantial interest in high-power lasers and amplifiers for various applications. See, for example, L. Zenteno, "High-power double-clad fiber lasers", *Journal of Lightwave Technology*, 11(9), 1435–1446, 1993. Yb-doped double-clad fibers are finding current and potential applications in military and aerospace, materials processing, printing and marking, spectroscopy, telecommunications, etc. See, for example, Paschotta et al. and Zenteno as referenced above, J. Noda, K. Okamoto and Y. Sasaki, "Polarization maintaining fibers and their applications", *Journal of Lightwave Technology*, 4(8), 1071–1089, 1986, and J. P. Koplow, L. Goldberg, R. P. Moeller and D. A. V. Kliner, "Polarization-maintaining, double-clad fiber amplifier employing externally applied stress-induced birefringence", *Obtics Letters*, 25(6), 387–389, 2000.

For many high-power laser and amplifier applications, operation under stable linear polarization is desirable. See Noda et al. and Koplow et al. as above. High-power amplifier (or laser) architectures are based on coherently combining the output of several DC fiber amplifiers. With the growing need for output powers of greater than 100 kW continuous wave (CW) for military and aerospace application and several kW outputs for industrial applications, there has been an increasing demand for polarization-maintaining double clad fibers (PM-DCF). Different approaches are known for obtaining PM operation using non-PM fibers. See, for example, Koplow et al. as above and I. N. Duling III and R. D. Esman, "Single-polarisation fibre amplifier", *Electronics Letters*, 28(12), 1126–1128, 1992. However, these approaches have their limitations and the preferred technology is to use a PM-DCF. While passive polarization maintaining fibers have been commercially available for several years, active PM fibers have not been available until recently. See, for example, K. Tajima, "$Er^{3+}$-doped single-polarisation optical fibres," *Electronics Letters*, 26(18), 1498–1499, 1990 and D. A. V. Kliner, J. P. Koplow, L. Goldberg, A. L. G. Carter and J. A. Digweed, "Polarization-maintaining amplifier employing double-clad bow-tie fiber", *Obtics Letters*, 26(4), 184–186, 2001. Kliner et al. were the first to report a polarization maintaining, Yb-doped, double-clad fiber amplifier employing a bow-tie fiber. Although a bow-tie type PM-DCF is acceptable for proof of concept and research and development, it has substantial limitations in terms of preform manufacturability, uniformity and scalability.

Single mode, Yb-doped, double-clad fibers lend themselves well to applications requiring compact lasers with diffraction-limited output. However, the scalability of output powers can be limited by amplified spontaneous emission and nonlinear processes such as stimulated Raman scattering (SRS) and stimulated Brillouin scattering (SBS). These limitations can be overcome by using low numerical aperture (NA) single mode fibers with large mode areas (LMA). The low NA of the core limits the capture of the spontaneous emission by the core while the large mode area increases the threshold for SRS and SBS. In a second approach, multimode (MM) rare earth doped fibers can be used and the higher order modes suppressed by deploying the fiber in a specific coiled configuration (J. P. Koplow, D. A. V. Kliner and L. Goldberg, "Single-mode operation of a coiled multimode fiber amplifier", Obtics Letters, 25(7), 442–444, 2000), optimizing launch conditions of the seed beam (M. E. Fermann, "Single-mode excitation of multimode fibers with ultra-short pulses," *Obtics Letters*, 23(1), 52–54, 1998 and O. G. Okhotnikov and J. M. Sousa, "Flared single-transverse-mode fibre amplifier", Electronics Letters, 35(12), 1011–1013, 1999), designing fibers with specific refractive index and dopant profiles (H. L. Offerhaus, N. G. Broderick, D. J. Richardson, R. Sammut, J. Caplen and L. Dong, "High-energy single-transverse-mode Q-switched fiber laser based on a multimode large-mode-area erbium-doped fiber", Obtics Letters, 23(21), 1683–1685, 1998), and using specific cavity configurations (U. Greibner and H. Schonnagel, "Laser operation with nearly diffraction-limited output from a Yb-YAG multimode channel waveguide", Obtics Letters, 24(11), 750–752, 1999). The use of a MM fiber in single mode operation provides similar advantages as the LMA fibers.

SUMMARY OF THE INVENTION

In one aspect, there is provided a polarization maintaining optical fiber having a core extending along a longitudinal axis, where the core includes a rare earth and a first index of refraction. A cladding is disposed about the core and has a first thermal coefficient of expansion (TCE) and a second index of refraction that is less than the first index of refraction. The fiber includes a pair of longitudinally extending members, and each of the members has a TCE that is different than the first TCE of the cladding. The pair is spaced apart by a distance $d_i$. A second cladding is disposed about the first cladding, and the second cladding has a third index of refraction that is less than the second index of refraction. The fiber has a fundamental mode having a mode field diameter (MFD). The core can be a multimode core having a diameter $d_c$ that is greater than or equal to 15 microns, the numerical aperture of the core relative to the first cladding can be less than or equal to 0.12, the ratio $d_f$/MFD can be greater than or equal to 3, and the fiber can provide a beat length of less than 3.5 mm at a wavelength of 633 nm.

The invention can comprise many features. The core can have a diameter $d_c$ that is greater than or equal to 25 microns, greater than or equal to 35 microns, or greater than or equal to 50 microns. The ratio of $d_f$/MFD can be greater than or equal to 5. The rare earth can include ytterbium. The numerical aperture of the core relative to the cladding can be less than or equal to 0.10 or less than or equal to 0.08.

In other aspects of the invention, each of the longitudinally extending members can comprise 10–12 mole percent of a first compound that includes boron and 1–3 mole percent of a second compound that includes phosphorus. Each of the longitudinally extending members can comprise 10–18 mole percent of a compound that includes phosphorus and 3–6 mole percent of a compound that includes boron. Each of the longitudinally extending members can comprise 10–14 mole percent of a first compound that includes boron and 1–6 (preferably 4–6) mole percent of a second compound that includes phosphorus. Each of the longitudinally extending members can comprise 10–18 mole percent of a compound that includes boron and 3–7 mole percent of a second compound that includes phosphorus. The compound that includes boron can be $B_2O_3$ and the compound that includes phosphorus can be $P_2O_5$. Each of the longitudinally extending members can comprise one or both of $B_2O_3$ and $P_2O_5$. In one aspect of the invention, a longitudinally extending region includes boron and is substantially free of phosphorus. Boron can be in the form of $B_2O_3$ and have a concentration of from 14–22 mole percent. Stating herein that a fiber includes a concentration of $B_2O_3$ or $P_2O_5$ means that the fiber is analyzed using wavelength dispersive spectroscopy (WDS) and the concentration of oxygen and/or other ions measured. The concentration of boron is inferred. It is then assumed that the compounds $B_2O_3$ and $P_2O_5$ are formed and the appropriate concentrations determined. It may necessary to assume a form for rare earth compounds (e.g., $Er_2O_3$, $Yb_2O_3$, etc.). Such a technique is well known in the art and is not further discussed.

The optical fiber can be a Panda-type fiber, and the optical fiber can be drawn from a preform having stress members inserted into holes so as to form the longitudinally extending members of the fiber when said fiber is drawn.

DETAILED DESCRIPTION

Two substantially different PM fiber manufacturing technologies can be used for making PM-DC fibers. The suitability of such technologies can be evaluated according to two criteria: (a) the suitability of the particular process-technology for making double-clad fibers and (b) the potential of preform scalability, reproducibility and consistency for volume production.

Figure 1A:
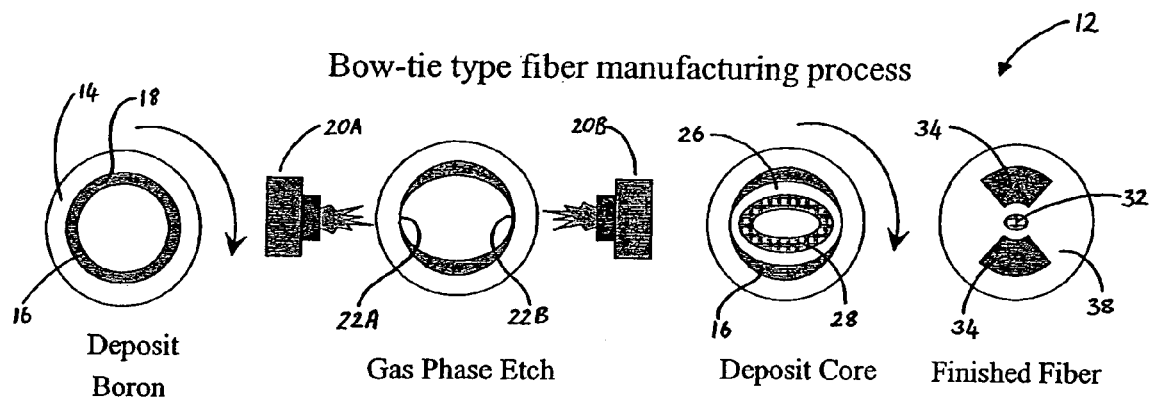
FIGS. 1A and 1B schematically illustrate the steps involved in the fabrication of bowtie and Panda-type polarization maintaining fibers.

FIG. 1A shows a schematic diagram of the steps typically involved in making a bow-tie type PM fiber 12. A high quality synthetic quartz tube 14 can be used as a substrate. Several layers 16 of borosilicate glass are deposited on the inner wall 18 of the rotating substrate tube 14. Next the substrate rotation is stopped and using specialized ribbon burners 20A and 20B the boron in the glass is volatilized from selected sectors 22A and 22B of the deposited layers 16. Alternatively, a single burner 20A can be used to volatize sector 22B and the substrate tube 14 rotated by 180 degrees and sector 22B volatilized. Special care is taken to ensure that the sectors 22A and 22B of glass from which the boron has been volatilized are diametrically opposite to each other and dimensionally equal. Several layers 26 of glass are further deposited before the layer(s) 28 for the rare earth doped core 32 is (are) deposited. The layers 26 act as a buffer between the borosilicate stress members 34 and the core 32 and ensure that the evanescent field does not propagate in the stress elements to any significant extent. The deposition of the Yb-doped core 32 (or of a core including one or more other rare earths) can include the use of solution doping technology. The substrate tube 14 with the various layers of deposited glass (16, 26, 28) is then carefully collapsed into a rod. The collapsed preform is further processed to obtain the desired inner cladding 38 and drawn with a low-index fluoroacrylate polymer coating to provide the second cladding (not shown) to guide the pump light. Using this methodology a bow-tie type Yb-doped PM-DC fiber 12 can be fabricated.

The stress members 34 and the rare-earth doped core 32 can be fabricated in one process step, and the distance of the stress members 34 from the core 32 can be controlled by the number of buffer layers 26 deposited between the stress layers and the layer(s) 28 that form the core 32. The stress elements 34 can be brought rather close to the core 32 and hence, for a given size and composition of the stress elements 34, a high birefringence can be achieved.

However, this technology has several significant disadvantages. The need to deposit stress elements 34 and a rare-earth doped core 32 within the same substrate tube 14 limits the ability to independently control the polarization and lasing properties of the fiber. Second, although the stress elements 34 can be brought close to the core 32, the size of the stress elements 34 that can be deposited is restricted and limits the size of the preform that can be made with a desired birefringence. In other words, the technology doesn't lend itself to volume production. Finally, most DC fibers require a non-circular geometry of the inner-cladding (e.g., 38 in FIG. 1A) which calls for some processing step, such as grinding or thermal processing, to obtain a desired geometry. In the case of a bow-tie type preform, the grinding (or thermal processing) operation has to be conducted with the stress members 34 in place. PM preforms are fairly fragile because of the large amount of stress incorporated in the preform and prone to fracture on exposure to mechanical (or thermal) shock during a grinding (thermal processing) operation. The bow-tie preform technology is therefore not preferred for making volume production of PM-DC fiber.

Because most desirable amplifier architectures involve coherently combining output of tens, if not hundreds, of fiber amplifiers, it is desirable that the technology chosen for preform and fiber fabrication is scalable for volume production and capable of producing very uniform fibers.

The technology described herein to make the Panda-type of PM-DC fibers can offer certain advantages and address limitations of the bow-tie technology. In this process, both the rare-earth doped preform and stress member fabrication steps are effectively decoupled, providing independent and highly effective control of the polarization properties and composition of the rare-earth doped glass. Second, fairly large stress-inducing members can be fabricated, which substantially increases the limit of preform size and makes the process more suitable for preform scale-up. Finally, all required processing to achieve a non-circular geometry can be accomplished prior to incorporating the stress-members, and hence, improve production yields. The Panda-type PM technology is therefore suitable for fabricating PM-DC fibers and is a good choice for volume production.

Figure 1B:
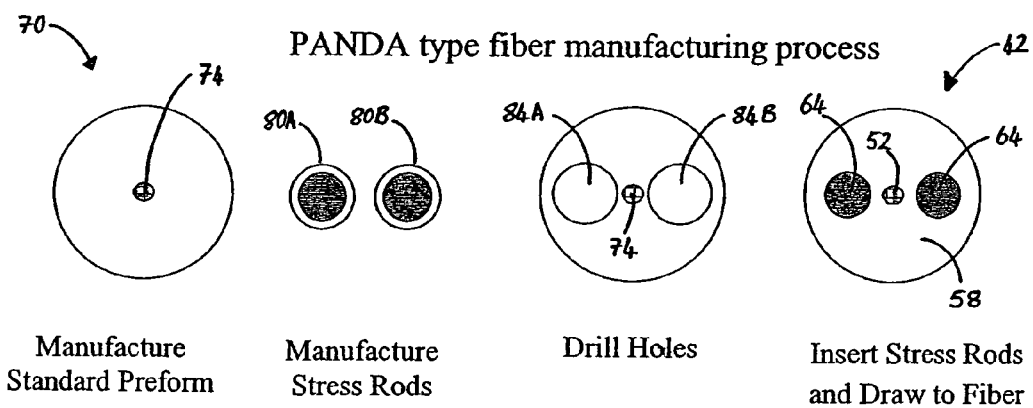

FIG. 1B schematically illustrates the main steps in fabricating a Panda-type PM fiber. Design considerations involved in providing a large core, low NA, Yb-doped, Panda-type, PM-DC fiber 42 are described below. In a preferred embodiment, the invention comprises a Panda-type PM-DC fiber 42 comprising a 0.06 NA, 30 micron Yb-doped core 52 and an inner cladding 58 having a 400 micron diameter with a numerical aperture of 0.37.

Panda-type PM-DC fiber can be fabricated in two stages. Here the fabrication of the stress members 64 is decoupled from the fabrication of the rare-earth doped preform 70. This provides significant advantages, to be discussed later. The rare-earth doped preform 70 can be fabricated using a solution-doping technology to yield highly uniform rare-earth and co-dopant distribution.

A high quality synthetic quartz tube is used to deposit rare earth doped glass. The tube is then collapsed into a rod and further processed such that, when drawn from the preform 70, which includes a core region 74, the fiber will have the desired core 52 and inner cladding 58 dimensions. In a separate step circular stress elements 80A and 80B of desired composition are fabricated via MCVD. Two holes, 84A and 84B, of the desired dimension are drilled, diametrically opposite to each other and on either side of the core region 74, in the rare-earth doped preform 70. The circular stress members 80A and 80B are inserted into the holes 84A and 84B and incorporated into the preform 70. The preform 70 with the stress members 80A and 80B is then drawn to desired size fiber 42 with a low index fluoroacrylate polymer coating (not shown).

PM fibers 12, 42 rely on residual stress anisotropy across the core 32, 52 which arises from differences in thermal expansion coefficient ($\Delta\alpha$) between the stress members 34, 64 and core and cladding 38, 58. The composition, location and geometry of the stress members determine the birefringence in the fiber. The compositional design of stress members and the geometrical design of the PM-DC fiber are modeled using known models, e.g., a model based on the thesis of Bent Edvold entitled "Polarization Maintaining Fibers", Electromagnetics Institute, Technical University of Denmark, EF-402, April 1994, to predict the index of refraction and the expansion coefficient of the glass based on composition of the deposited glass. This in turn is used as inputs for predicting the birefringence, based on geometric considerations. The models can also be used in the design and development of passive 125 μm and 80 μm diameter PM fiber products for telecommunication and gyroscope applications.

Optical characterization of the PM Yb-doped DC fibers included measurements of crosstalk, beat length, absorption, fluorescence lifetime and slope efficiency. The polarization crosstalk measurement was performed in accordance with TIA/EIA-455-193 (FOTP-193) entitled "Polarization Crosstalk Method for Polarization-Maintaining Optical Fiber and Components". A system comprising of high-quality crystal polarizers, low birefringence optics and a computer-controlled precision alignment-system provided repeatable crosstalk measurements below −45 dB. Measurements were made on 10-meter long fiber samples, looped into 10-inch diameter coils. The secondary coating was removed from a large portion of each sample and the exposed fiber section was immersed in high refractive-index oil to strip out cladding light and ensure light propagation solely in the core.

Figure 2:
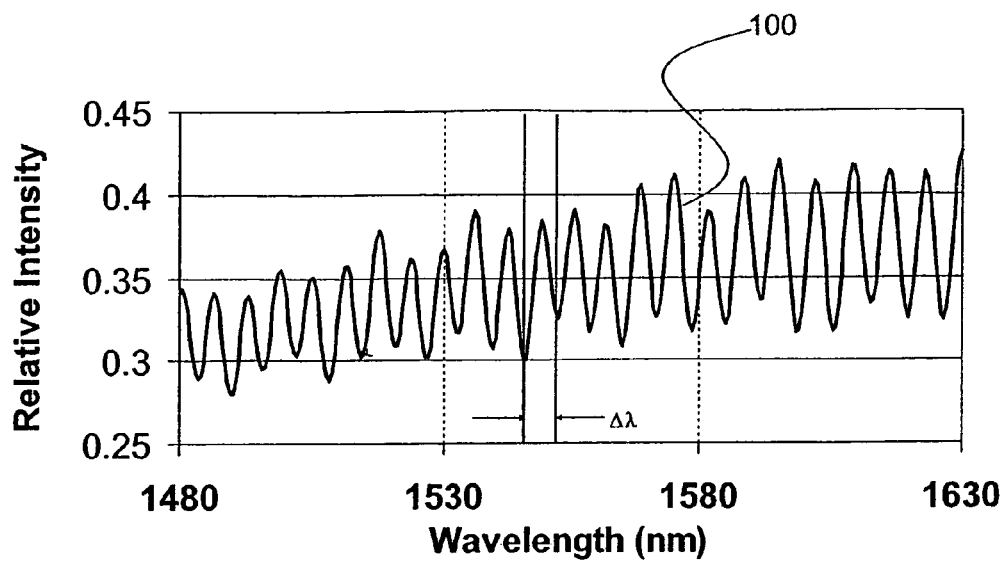
FIG. 2 is a plot of a typical curve used to calculate beat length.

Fiber beat length was measured using a GN Nettest S18 Dispersion Measurement System, which uses a wavelength-scanning technique known as the fixed analyzer method. Fully polarized light launched into a fiber is passed through a polarizer (the analyzer) that is fixed at the exit end. The output power is then recorded as a function of wavelength. A reference scan is then taken, without the analyzer, so that power fluctuations, due to non-PMD related effects, are taken into account. With reference to FIG. 2, in fibers with weak mode-coupling, such as PM single mode (SM) fibers, the scan of effective power with wavelength results in a curve 100 having a periodic intensity variation with a series of maxima and minima. Beat length can then be calculated for each wavelength from the spacing between the intensity peaks, using the following formula:

$$L_b = L \times \frac{\Delta\lambda}{\lambda}$$

where $L_b$ is the beat length, L is the length of fiber measured, $\lambda$ is the wavelength and $\Delta\lambda$ is the peak spacing.

Optical absorption for each PM-Yb-doped DC fiber was measured near 915 nm using an SDL-6380-L2 laser diode (JDS Uniphase), driven by an ILX Lightwave Model 39800 current source, and an Agilent Model 8163A lightwave multimeter with InGaAs optical head. An integrating sphere was used with the optical head to make power measurements NA insensitive, and a 915 nm band pass filter (Spectrogon) was used to block out any fluorescence resulting from the 915 nm input signal. The standard cutback method was utilized to determine fiber absorption.

Fluorescence lifetimes were measured on fiber samples using the aforementioned laser diode as a pump source. A small section of the fiber, following removal of the low-index coating, was placed next to an InGaAs detector and 1110 nm band pass filter (Spectrogon, 70 nm FWHM) so that fluorescence could be detected at a radial location from the fiber. The combination of the detector, band pass filter and a Fluke SW90W Oscilloscope was used to measure the fluorescence decay. Lifetimes are given as three e-folding times (e1 e2, e3) which describe the decay characteristics. Log-normal plots of the decay were fitted to better estimate those components of the lifetime (e2, e3) where the signal was noisy.

Figure 3:
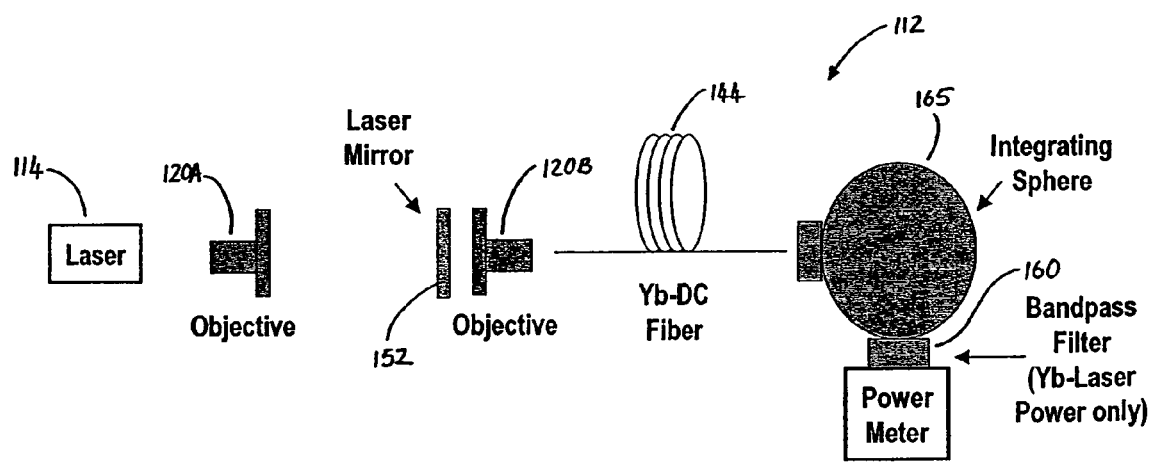
FIG. 3 schematically illustrates typical apparatus used to measure the slope efficiency of a rare earth doped fiber.

FIG. 3 schematically illustrates the measurement system 112 used to determine slope efficiency. The pump laser source 114 was the same 915 nm laser diode noted above. Light from the pump laser 114 was collimated and focused using microscope objectives 120A and 120B, appropriately chosen to best match the numerical apertures of the laser delivery fiber (not shown) from the laser 114 and Yb-DC fiber 144. A laser mirror 152, having greater than 99.8% reflectivity at the lasing wavelength and greater than 95% transmission at the pump wavelength, was placed in front of the focusing objective 120B. A band pass filter 160 was used, with an optical head/integrating sphere combination 165, to remove any pump light from the laser-power readings.

The dimensions and polarization properties (beat length and cross talk) of various PM-DC fibers made using either a bow-tie design or Panda-type stress-member design are presented in Table I. Fiber 1 is a bow-tie type Yb-doped PM-DC fiber (such as that shown in FIG. 1A). Because the size of the stress regions 34 that can be deposited was limited, only a fiber with a 200 μm inner-cladding diameter was fabricated to get the maximum possible birefringence. Two exemplary Panda-type PM-DC fibers are described. The first fiber has a 10 μm diameter Yb-doped core 52 with a 0.08 NA. The inner cladding 58 has a 400 μm diameter and a 0.45 NA. The second fiber includes a Yb-doped core. The core has a 30 μm diameter a NA of 0.06. The inner cladding 58 has a 400 μm in diameter and a NA of 0.37. Fiber 2 is a Panda-type Yb-doped PM-DC fiber. With reference to FIG. 1B, the relative ease of making larger stress members 64 allowed for a fiber having an inner cladding 58 having a diameter of 400 μm. The beat length of the two fibers was measured using the aforementioned wavelength scanning method and the birefringence calculated. It can be noted from Table I that Fiber 1, whose dimension was minimized to maximize the birefringence, had a beat length of only 4 mm at 633 nm. In comparison, Fiber 2 gave a beat length of 2.7 mm at 633 nm, even with an inner-cladding diameter of 400 μm. The results demonstrate that it is relatively easy to achieve higher birefringence in Panda-type PM-DC fibers compared to bow-tie type PM-DC fibers 12.

As discussed above, high power laser and amplifier applications benefit from fibers with low numerical apertures and large cores to obtain high pulse energies and increase the threshold for non-linear effects. In addition, polarization maintaining versions of these fibers can allow the coherent combination of the outputs of several fibers to achieve tens to hundreds of kW of output power. Kliner et al. demonstrated a polarization maintaining amplifier using a bow-tie type PM-DC fiber (made similar to Fiber 1) with a low NA core. However, the core was only 10 μm in diameter. Recent work has shown that multimode rare-earth doped fibers can be used in several configurations to achieve single mode operation. (See, for example, Koplow et al., Obtics Letters, 25(7), 442–444, 2000, Fermann et al., Obtics Letters, 23(1), 52–54, 1998, Okhotnikov et al., Electronics Letters, 35(12), 1011–1013, 1999, Offerhaus et al., Obtics Letters, 23(21), 1683–1685, 1998 and Greibner et al., Obtics Letters, 24(11), 750–752, 1999.) This technology is expected to enable the construction of fiber lasers capable of delivering greater than 100 kW output. However, polarization maintaining versions of double-clad fibers with multimode, low NA, rare earth doped cores are needed to realize this goal.

TABLE I

Characteristics of bow-tie and Panda-type PM fibers

| | Fiber 1 | Fiber 2 | Fiber 3 |
|---|---|---|---|
| Stress Member Type | Bow-tie | Panda | Panda |
| Core Size (μm) | 10 | 10 | 30 |
| Core NA | 0.06 | 0.08 | 0.06 |
| Clad Size (μm) | 180 | 400 | 400 |
| Clad NA | 0.31 | 0.45 | 0.37 |
| Absorption at 915/975 nm (dB/m) | 0.65/2.14 | 0.26/0.86 | 0.67/2.2 |
| Lifetimes e1, e2, e3 (microseconds) | 870, 850, 870 | 850, 810, 840 | 880, 820, 840 |
| Crosstalk (dB) 10 meters, 10 inch coil | −26 | −41.5 | −30 |
| Beat Length normalized to 633 nm (mm) | 4 | 2.7 | 4.4 |
| Birefringence ($\times 10^{-4}$) | 1.58 | 2.34 | 1.44 |

Table I describes two Panda-type and one bow-tie type PM-DC fibers. All fibers had low NA cores in the range of 0.06 to 0.08. The specific parameters such as core size, NA, clad size, absorption, etc. for these fibers are presented in Table I. The cores of all fibers were doped with ytterbium (Yb) and suitable co-dopant(s), such as aluminum or phosphorus, to promote homogeneous dispersion of the Yb ions. However, these co-dopants often raise the refractive index of the core and can only be used in limited amounts to achieve a low core NA. It is therefore desirable to ensure that sufficient co-dopants are available to prevent quenching of the fluorescence.

Figure 4A:
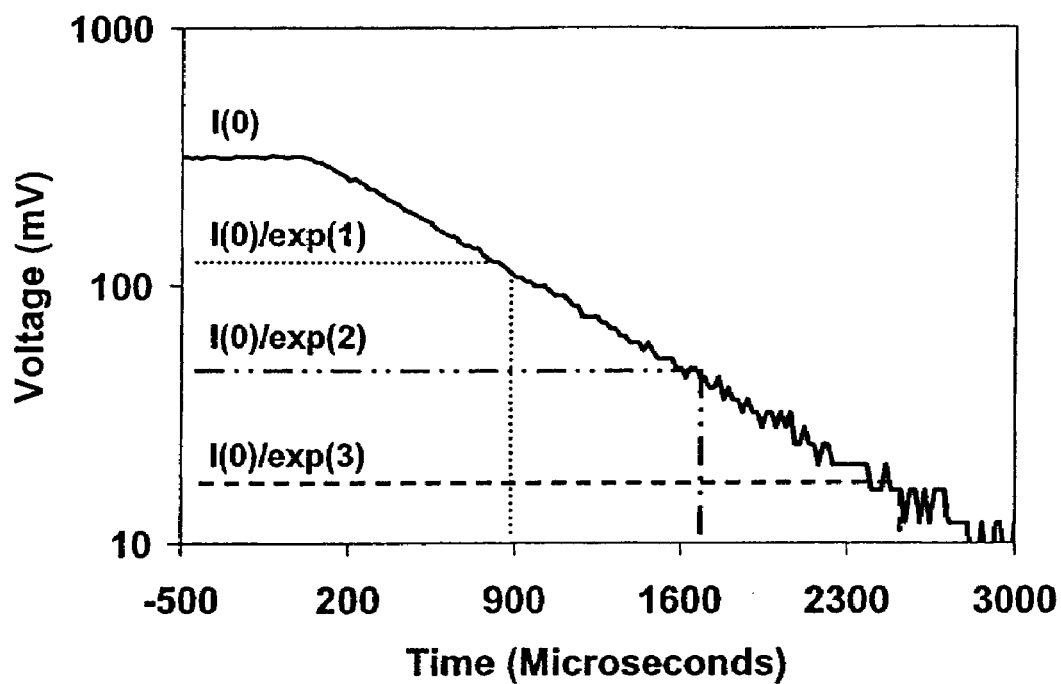
FIG. 4A shows the results of a fluorescence lifetime measurement for Yb doped PM-DC fiber.

Fluorescence lifetimes were measured on all fibers, therefore, to get an idea of efficiency. FIG. 4A shows the fluorescence lifetime typical of these fibers. The lifetimes for all three fibers are about 0.9 ms, similar in magnitude to other $Yb^{3+}$-doped silicate-glass lifetimes reported in the literature. See, for example, M. Digonnet, Rare-Earth Doped Fiber Lasers and Amplifiers (Second Edition), Marcel Dekker, Inc. N.Y., 2001, 637; R. Paschotta, J. Nilsson, P. R. Barber, J. E. Caplen, A. C. Tropper, and D. C. Hanna, "Lifetime quenching in Yb-doped fibers", *Optics Communications*, 136, 375–378, 1997; Z. Burshtein, Y. Kalisky, S. Z. Levy, P. Le Boulanger and S. Rotman, "Impurity local phonon nonradiative quenching of $Yb^{3+}$ fluorescence in Ytterbium-doped silicate glasses", *IEEE Journal of Quantum Electronics*, 36 (8), 1000–1007, 2000. In addition, the closeness of the e2, e3 times to e1 (for all fibers) indicate the Yb ions are decaying at the same rate, i.e. the ions appear to be homogeneously dispersed.

Three e-folding times of similar magnitude, however, may not fully indicate a low fluorescence-quenching glass. Paschotta et al. have reported quenching of $Yb^{3+}$ fluorescence in silicate glass fibers, under lasing conditions, with $Yb^{3+}$ levels as low as 1200 ppm (by weight), even though no quenching behavior was exhibited from the measured fluorescence lifetime. Emission quenching was attributed to a non-radiative decay on the order of a few microseconds, at most, that could not be detected with their measurement system. They also fabricated a particular fiber sample (2300 ppm $Yb^{3+}$ by weight) that did not exhibit fluorescence quenching, and therefore attributed the cause of non-radiative effects to be processing-induced. In a later publication, Burshtein et al reported similar $Yb^{3+}$ fluorescence quenching having rates between 6–300 microseconds. Given the response time of our measurement system is tens of microseconds, we cannot conclusively say, from the lifetime measurements alone, the Yb-DC fibers will be efficient if the non-radiative effects are on the order of 1–10 microseconds. However, no quenching rates between 100–300 microseconds could be observed.

Figure 4B:
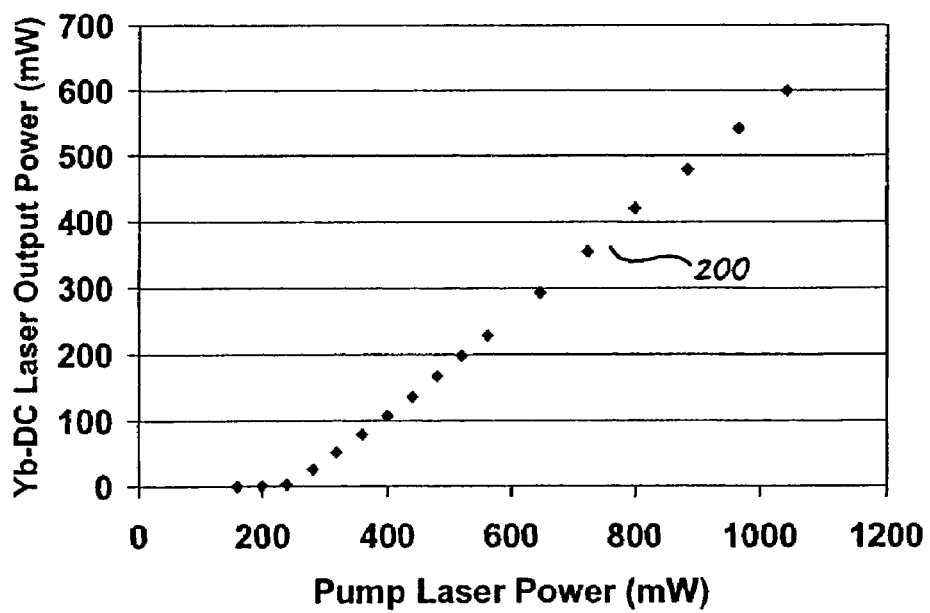
FIG. 4B shows a plot indicating the slope efficiency measured for a Yb-doped PM-DC fiber.

FIG. 4B provides a curve 200, which is a direct measurement of slope efficiency, and hence a more conclusive indicator of fiber performance. A measured slope efficiency of 77% was obtained, with the lasing wavelength of about 1090 nm and a threshold near 250 mW. This measured efficiency is very close to the quantum limit of 84% for these pump and signal wavelengths. The results clearly indicate a low NA rare-earth doped fiber can be fabricated having high efficiency and a suitable concentration of rare-earth ions.

Using this glass composition a Panda-type PM-DC fiber (Fiber 3) with a 0.06 NA, 30 micron diameter, Yb-doped core was fabricated. Fiber 3 has an inner-cladding diameter of 400 μm and is coated with a low index polymer, providing an inner cladding NA of 0.37. The low index polymer coating is further protected by a standard, telecom-grade acrylate coating. The PM-DC fiber with a multimode core in Table I exhibited an absorption of 0.67 dB/m at 915 nm (2.2 dB/m at 975 nm). The beat length of the fiber was measured to be 4.4 mm at 633 nm which corresponds to a birefringence of $1.44 \times 10^{-4}$. Although a PM-DC fiber with a 30 micron diameter core has been demonstrated, it is expected that further work is needed to enhance the birefringence in the fiber. The design consideration in making PM-DC fiber and the analysis below indicate that birefringence can be substantially increased. Thus, PM-DC fibers with low NA, multimode cores are practical and can be expected to play a significant role in the development and production of high power lasers and amplifiers.

Figure 5:
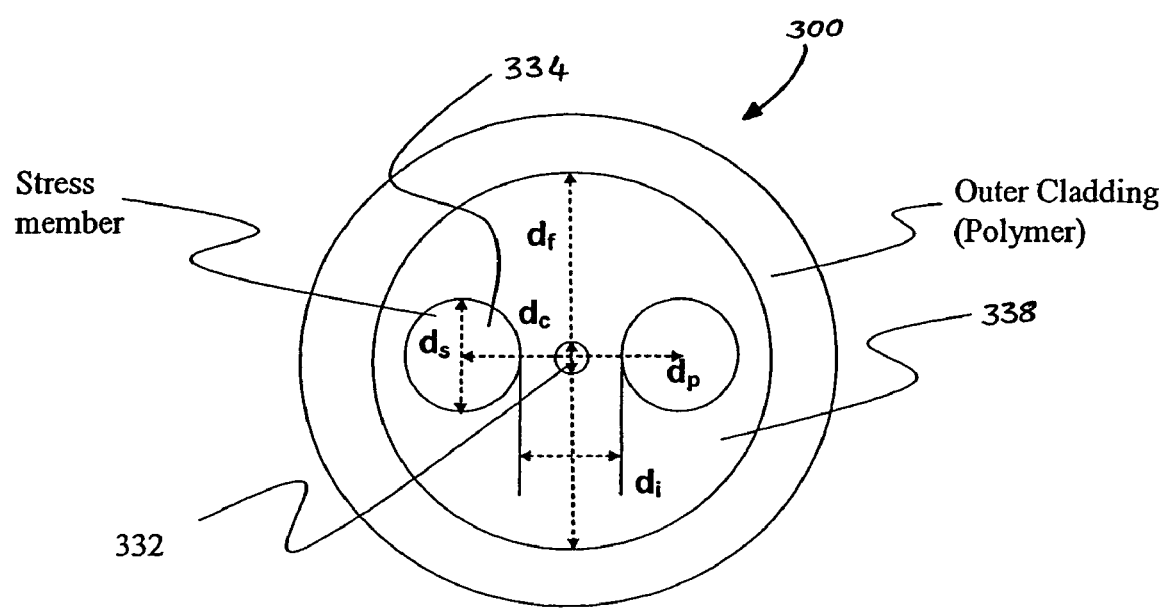
FIG. 5 depicts a cross section of Panda-type PM-DC fiber.
Figure 6A:
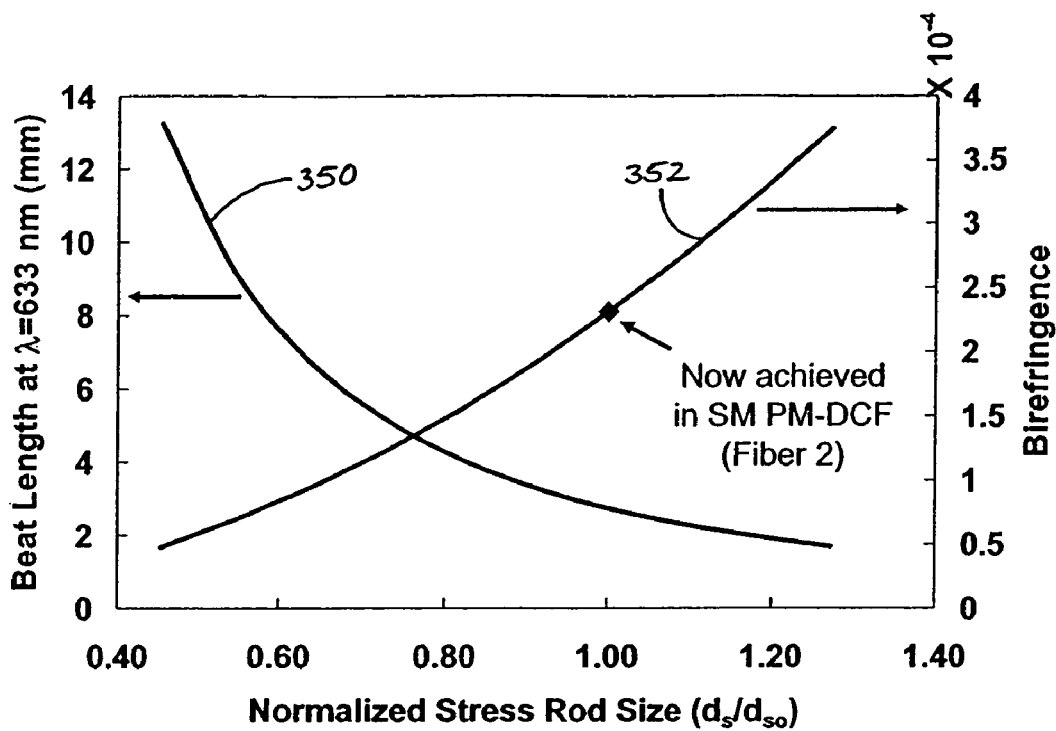
FIG. 6A shows the birefringence and beat length of one PM-DC fiber as a function of the size of the stress members.
Figure 6B:
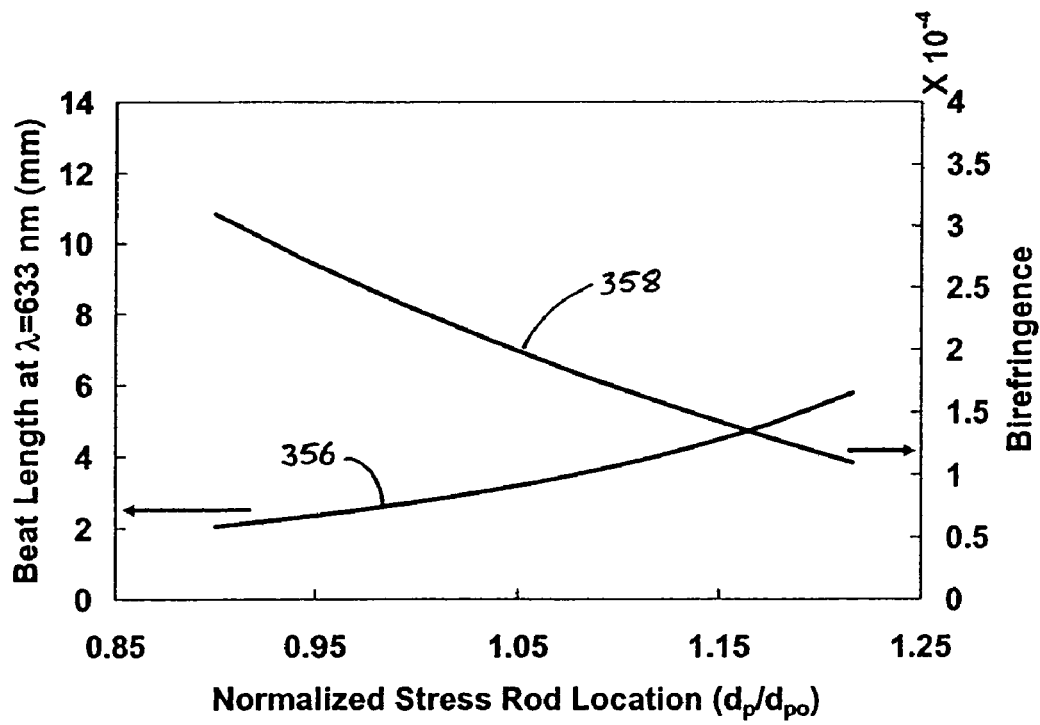
FIG. 6B shows the birefringence and beat-length of one PM-DC fiber as a function of the location of the stress members.

Referring to FIG. 5, we now discuss in more detail the more important dimensional parameters that determine the birefringence that can be obtained in a PM-DC fiber. FIG. 5 uses a Panda-type DC fiber 300 for purpose and illustration of these parameters. The more important parameters include the size ($d_s$) of the stress members 334 and the position of the stress members 334 relative to the diameter ($d_f$) of the inner cladding 338 and the diameter ($d_c$) of the core 332. In addition to the geometric factors the composition of the stress members 334 determines the birefringence that is achieved in the fiber. FIGS. 6A and 6B show the effect of the size ($d_s$) and location ($d_p$) of the stress members 334 on the birefringence (and beat length) of the fiber. As can be seen from curves 350 and 352 in FIG. 6A the birefringence can be increased (or the beat length reduced) by increasing the size of the stress members ($d_s$) and keeping all other parameters constant. Similarly, curves 356 and 358 of FIG. 6B show that the birefringence can be increased by moving the stress members 334 closer to the core 332, that is, decreasing $d_p$.

While it is theoretically possible to use these two geometric parameters to achieve very large values of birefringence, a limiting criterion imposed on $d_s$ and $d_p$ is the distance of the stress members 334 from the core 332. This limiting distance is indicated by distance ($d_l$) between the inside edges of the stress members 334. If $d_l$ becomes very small, the probability of overlap between the mode field and the stress members 334 increases, resulting in increased attenuation and bend loss at the laser or amplifier signal wavelength. In order to provide a safety margin for avoiding any overlap between the modal power profile in the fiber and the stress members, it is preferred that the ratio of $d_l$/MFD is greater than 2; more preferably the ratio $d_l$/MFD is greater than 3; and most preferably the ratio $d_l$/MFD is greater than 5. The term "MFD" as used herein refers to the mode field diameter of the fundamental mode of the fiber, as is well known in the art.

We consider a ratio of $d_l$/MFD greater than 5 in the following analysis. One of ordinary skill in the art, in light of the disclosure herein, will readily understand how the results of the analysis change based on a different ratio. For small core single mode fibers used in low to medium power applications, it is possible to achieve sufficient birefringence using standard stress member compositions and operate well within the limiting ratio. However, for large core fibers needed for high power applications, achieving sufficient birefringence while operating within the limiting ratio is more challenging.

Figure 7A:
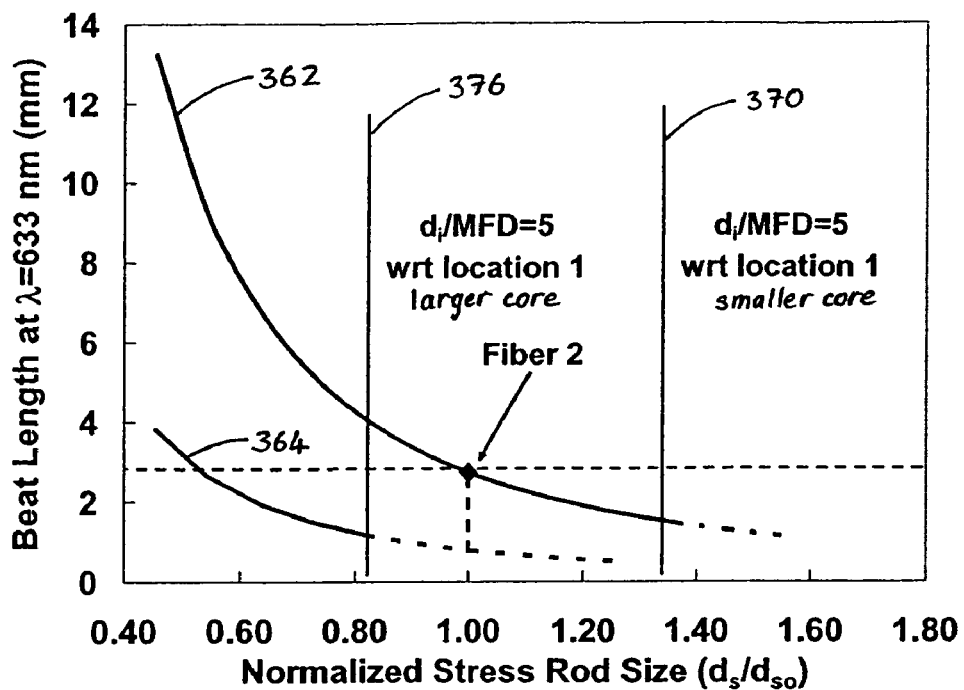
FIG. 7A indicates limits on birefringence using standard and high birefringence rods for a single mode (SM) fiber (Fiber 1) and a large mode area (LMA) fiber (Fiber 2) for different sizes of the stress members when the stress members are at a first location 1.
Figure 7B:
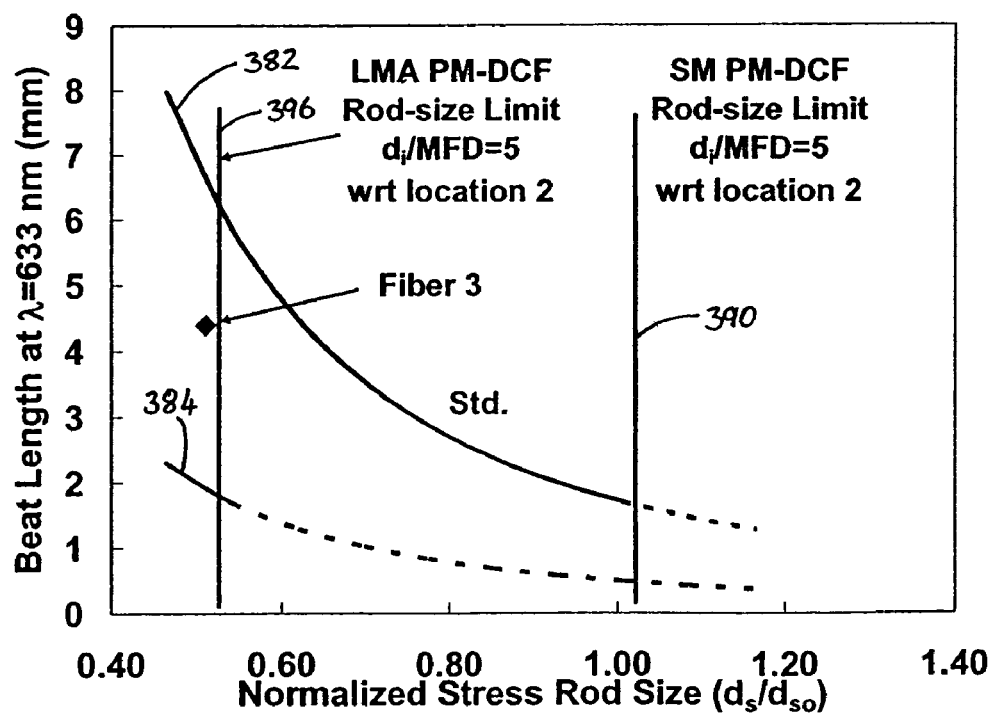
FIG. 7B indicates limits on the birefringence using standard and high birefringence rods in SM fiber (Fiber 1) and LMA fiber (Fiber 2) for different sizes of the stress members when the stress members are at a second location.

Fiber 2 is an example of PM-DC fiber for use in low to medium power applications and has a core 332 having a small (10 μm) diameter $d_c$. A beat length of 2.7 mm at 633 nm, which corresponds to a birefringence of $2.31 \times 10^{-4}$, was measured for Fiber 2. FIGS. 7A and 7B show the predicted beat length as a function of the size $d_s$ of the stress members 334. FIG. 7A includes a first curve 362 for a Panda-type fiber and a second curve 364 for a Panda-type fiber having stress members having a modified composition as is discussed in more detail below. FIG. 7B also includes two curves 382 and 384. Curve 382 corresponds to a Panda-type fiber and curve 384 corresponds to a Panda-type fiber having stress members having a modified composition, as is discussed in more detail below. The experimentally measured beat length for Fiber 2 is plotted for reference in FIG. 7A. In addition, a vertical line 370 representing the limiting ratio $d_l$/MFD equal to 5 for SM PM-DC fiber (e.g., Fiber 2) is also shown. Stress member sizes falling to the left of this vertical line 370 are permitted, and those falling to the right of the vertical line 370 are not permitted because the limiting distance, $d_l$, becomes small and the ratio $d_l$/MFD is less than 5. It is clear that Fiber 2 is well within the limiting ratio and a fairly low beat length has been achieved. It is also observed from FIG. 7A that for a small core fiber a beat length of less than 2 mm can be achieved without crossing the limiting ratio.

FIG. 7A shows a second vertical line 376 that depicts the limiting ratio for a PM-DC fiber with a 30 micron core 332 (Fiber 3). Stress member sizes ds to the left of the vertical line 376 are permitted, and those to the right are not permitted. Therefore, one can expect the stress members to be smaller for the PM-DC fibers with multimode cores 332 as compared to those with SM cores 332. In order to achieve a higher birefringence, it was necessary to move the stress members closer to the center of the fiber to reduce $d_l$. The predicted beat-length for a nearer location (location 2) is shown in FIG. 7B. Vertical line 390 indicates the $d_l$/MFD greater than 5 limit for a smaller core fiber (e.g., Fiber 2) and vertical line 396 indicates the $d_l$/MFD greater than 5 limit for a larger core fiber (e.g. Fiber 3). Comparing FIGS. 7A and 7B, we can see that a higher beat-length can be attained for the same stress members size $d_s$ at location 2 compared to location 1. Fiber 3 is a large (30 um) core PM-DC fiber that is suitable for high power applications. When stress members were placed at location 2 for this fiber, a beat length of 4.4 mm at 633 nm, corresponding to a birefringence of $1.44 \times 10^{-4}$, was obtained (FIG. 7B). In order to stay within the limiting ratio, the stress member size had to be kept small and hence a birefringence comparable to the small core fiber (Fiber 2) was not achieved. It is clear from FIGS. 7A and 7B that, in the case of large core fibers, such as those used in moderate to high power lasers and amplifiers, the limit of $d_l$/MFD equal to 5 is reached well before the desired birefringence is achieved. Hence, for large core fibers, the composition of the stress member has to be changed so that higher birefringence can be achieved while using small stress members.

It is known to include boron in a silica stress member 334 to provide the stress member with a thermal coefficient of expansion (TCE) that is different than the TCE of the cladding 338, which can be a silica glass, such as a silica glass doped with fluorine to decrease the index of refraction of the cladding 338. Incorporation of boron can be difficult, especially where the stress members 334 are made as separate members and inserted into holes drilled into a preform (see U.S. Pat. No. 4,561,871, entitled "Method of Making Polarization Preserving Optical Fiber" and incorporated herein by reference). The stress members 334 can shatter during manufacture and processing due to the stress. However, the analysis herein indicates that higher stress is advantageous for fibers having the ratios discussed above and a predetermined birefringence. One approach to changing the composition of the stress member is to add both boron and an index increasing material (boron is index decreasing) to the stress member, such as a silica stress member. Incorporation of both boron and another material, such as phosphorous, is usually avoided due to the extra complication of adding another material to the stress member. However, according to the invention two different materials, such as boron and phosphorous, are added to a glass stress member. As understood to one of ordinary skill in the art, the boron that is incorporated into the stress member is typically considered present therein, at least in part, in the form of $B_2O_3$. Similarly, such phosphorous is typically included, at least in part, in the form of $P_2O_5$. Phosphorus, as is known in the art, acts to change the TCE of the stress members.

In one practice of the invention, the predominant compound in which the boron alone (i.e., without any P, such as $B_2O_3$) is present is included in the stress member is a higher mole percent than the predominant compound into which the phosphorous is incorporated. For example, the stress member can be silica glass and include 10–12 mole percent of first aforementioned predominant compound and 1–3 mole percent of the second aforementioned predominant compound. In another practice, the reverse is true—the predominant compound in which the boron alone (i.e., without any P, such as $B_2O_3$) is present is included in the stress member is a lower mole percent than the predominant compound into which the phosphorous is incorporated. For example, the stress member can be silica glass and include 3–6 mole percent of the first aforementioned predominant compound (boron alone) and 10–18 mole percent of the second aforementioned predominant compound.

Predicted beat lengths as a function of stress member size for another composition are also presented in FIGS. 7A and 7B. Stress members with this composition are currently used to make PM fibers for gyroscope applications where very low beat lengths have to be achieved. A higher coefficient of thermal expansion difference, and hence higher birefringence, can be achieved with this stress member composition. It can be observed from FIG. 7B that with this stress member composition birefringence values comparable to those of small core fibers can be achieved while using small stress members and operating within the limiting ratio. A birefringence of $3.5 \times 10^{-4}$ can be achieved.

In another practice of the invention, the ratio of $d_i$ to the diameter $d_c$ of the core 332 is considered. In this practice, it is preferable that $d_i/d_c$ is greater than 3; more preferably $d_i/d_c$ is greater than 4, and most preferably $d_i/d_c$ is greater than 5.

Graphs such as those shown in FIGS. 7A and 7B can also be plotted for the foregoing ratios. As is known in the art, one technique for making PM-DCF is to drill holes in a preform and to insert stress members into the holes. Drilling too close to the center of the preform can cause problems with the core 332 of the preform due to vibration and the like.

According to the invention there is provided a low numerical aperture, large (multimode) core 332, PM-DC fiber that can be used for high power laser and amplifier applications. Preferably, the NA of the core 332 is less than or equal to 0.12, more preferably it is less than or equal to 0.10, and more preferably it is less than or equal to 0.08. The diameter $d_c$ of the core 332 can be greater than or equal to 15 microns. In another practice of the invention, $d_c$ is greater than or equal to 25 microns, and in yet a further practice of the invention, $d_c$ is greater than or equal to 35 microns. In one practice, $d_c$ is greater than or equal to 50 microns.

In the claims as well as in the specification above all transitional phrases such as "comprising", "including", "carrying", "having", "containing", "involving" and the like are understood to be open-ended, i.e., to mean "including but not limited to". Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision 1.

What is claimed is:

1. A polarization maintaining optical fiber, comprising:
   a core extending along a longitudinal axis, said core including a rare earth and a first index of refraction;
   a cladding disposed about said core and having a second index of refraction that is less than said first index of refraction, said cladding having a first thermal coefficient of expansion (TCE);
   a pair of longitudinally extending members, each of said members having a TCE that differs from said first TCE of said cladding, said pair being spaced apart by a distance $d_i$;
   a second cladding disposed about said cladding, said second cladding having a third index of refraction that is less than said second index of refraction;
   said fiber having a fundamental mode having a mode field diameter (MFD), and wherein
   said core is a multimode core having a diameter $d_c$ that is greater than or equal to 15 microns;
   the numerical aperture of said core relative to said first cladding is less than or equal to 0.12;
   the ratio $d_i$/MFD is greater than 2; and
   said fiber provides a beat length of less than 3.5 mm at a wavelength of 633 nm.

2. The optical fiber of claim 1 wherein said diameter $d_c$ is greater than or equal to 25 microns.

3. The optical fiber of claim 1 wherein said diameter $d_c$ is greater than or equal to 35 microns.

4. The optical fiber of claim 1 wherein said diameter $d_c$ is greater than or equal to 50 microns.

5. The optical fiber of claim 1 wherein the ratio of $d_i$/MFD is greater than 5.

6. The optical fiber of claim 1 wherein said rare earth includes ytterbium.

7. The optical fiber of claim 1 wherein said numerical aperture of the core relative to the cladding is less than or equal to 0.10.

8. The optical fiber of claim 1 wherein said numerical aperture of the core relative to the cladding is less than or equal to 0.08.

9. The optical fiber of claim 1 wherein said each of said longitudinally extending members comprises 10–12 mole percent of a first compound that includes boron.

10. The optical fiber of claim 9 wherein each of said longitudinally extending members comprises 1–3 mole percent of a second compound that includes phosphorus.

11. The optical fiber of claim 1 wherein said each of said longitudinally extending members comprises 10–18 mole percent of a compound that includes phosphorus.

12. The optical fiber of claim 11 wherein each of said longitudinally extending regions comprise 3–6 mole percent of second compound that includes boron.

13. The optical fiber of claim 1 wherein said each of said longitudinally extending members comprises $B_2O_3$ and $P_2O_5$.

14. The optical fiber of claim 1 wherein said fiber is a Panda-type fiber.

15. The optical fiber of claim 1 wherein said fiber is drawn from a preform having stress members inserted into holes so as to form said longitudinally extending members when said fiber is drawn.

16. The optical fiber of claim 1 wherein at least one of said longitudinally extending members includes a concentration of $B_2O_3$ from 14–22 mole percent.

17. The optical fiber of claim 1 wherein the ratio of $d_t/MFD$ is greater than 3.

* * * * *

UNITED STATES PATENT AND TRADEMARK OFFICE
CERTIFICATE OF CORRECTION

PATENT NO. : 7,110,647 B2  Page 1 of 1
APPLICATION NO. : 10/910924
DATED : September 19, 2006
INVENTOR(S) : Julia A. Farroni, Upendra H. Manyam and Kanishka Tankala It is certified that error appears in the above-identified patent and that said Letters Patent is hereby corrected as shown below:

At column 1, line 53, please replace "Obtics Letters" with --Optics Letters--.
At column 2, lines 11, 33, and 47, please replace "Obtics Letters" with --Optics Letters--.
At column 3, line 41, please replace "may necessary" with --may be necessary--.
At column 7, line 33, please replace "diamter a NA" with --diameter and a NA--.
At column 7, line 34, please delete the word "in".
At column 7, lines 60, 61, 63, and 64, please replace "Obtics Letters" with --Optics Letters--.

Signed and Sealed this

Second Day of September, 2008

JON W. DUDAS
*Director of the United States Patent and Trademark Office*